United States Patent Office 2,863,886
Patented Dec. 9, 1958

2,863,886
PROCESS FOR THE PRODUCTION 17α-ETHINYL DERIVATIVES OF ANDROSTANE SERIES OF COMPOUNDS

Octavio Mancera, Franz Sondheimer, and George Rosenkranz, Mexico City, Mexico, assignors to Syntex S. A., Mexico City, Mexico, a corporation of Mexico No Drawing. Application January 10, 1955
Serial No. 481,036

Claims priority, application Mexico January 20, 1954

2 Claims. (Cl. 260—397.5)

The present invention relates to a novel process for the production of cyclopentanophenanthrene derivatives.

More particularly the present invention relates to a novel process for the production of 17α-ethinyl-Δ⁴-androstene-3β,17β-diol a valuable known intermediate for the production of steroidal hormones such as ethinyl testosterone.

Several methods have previously been proposed for the production of 17-ethinyl-androstene-diol. In general however, these methods have not been altogether satisfactory inasmuch as they resulted in some instances, in relatively low yields of the desired compound and/or involved the handling dangers of potassium metal.

In accordance with the present invention there has been discovered a novel process for the production of steroidal C-17 ethinyl derivatives and especially 17-ethinyl-Δ⁴-androstene-3β,17β-diol in high yield under conditions substantially devoid of danger whereby the process is especially applicable to large scale production. In particular, there has been discovered a process for the production of 17-ethinyl-Δ⁴-androstene-3β,17β-diol involving the reaction of dehydroepiandrosterone (Δ⁵-androstene-3β-ol-17-one) with acetylene-di-magnesium bromide.

The acetylene-di-magnesium bromide can be obtained by the reaction of acetylene and methyl magnesium bromide (Grignard reagent) in accordance with the following equation:

$$HC \equiv CH + 2CH_3MgBr \rightarrow BrMgC \equiv CMgBr + 2CH_4$$

From the characteristics of the reagent acetylene-di-magnesium bromide it would be expected to react simultaneously with two keto groups whether or not these keto groups were present in the same or different molecules. Thus, in the reaction with dehydroepiandrosterone the formation of an adduct resulting from the reaction of one molecule of the dibromide with 2 molecules of the dehydroepiandrosterone would be expected. Surprisingly however it was discovered that the reaction of the acetylene-di-magnesium bromide with one molecule of dehydroepiandrosterone forms a compound of such low solubility in the organic solvent used as a reaction medium that it precipitates immediately and thus prevents the undesired reaction of the second active group of the dibromide with another molecule of the dehydroepiandrosterone.

The following equation illustrates the process of the present invention:

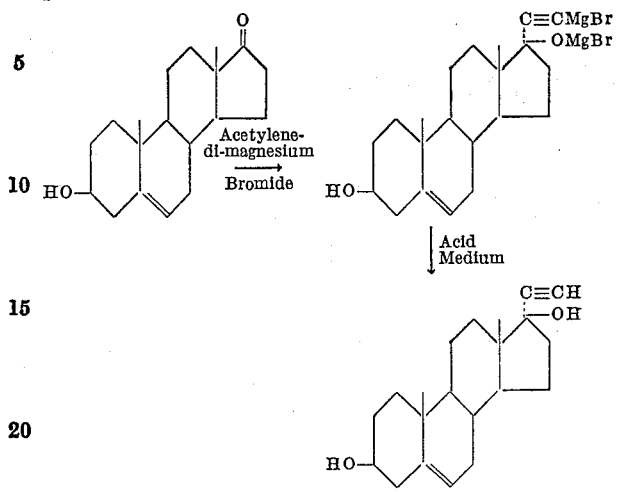

In practicing the process above outlined a steroidal C-17 ketone such as Δ⁵-androsten-3β-ol-17-one is dissolved in an organic solvent such as tetrahydrofurane and added to tetrahydrofurane solution of acetylene-di-magnesium bromide. The acetylene-di-magnesium bromide is preferably prepared in situ by passing acetylene for a substantial period of time, preferably of the order of three hours, through an organic solvent solution, such as a tetrahydrofurane solution of a Grignard reagent such as methyl magnesium bromide.

Upon heating, as on a steam bath, for a short period i. e. of the order of 15 minutes, a heavy precipitate forms. The mixture is then cooled and poured into an aqueous acid solution, preferably of a mineral acid such as sulfuric. The collected precipitate after washing until neutral and drying on a steam bath was 17-ethinyl-Δ⁵-androstene-3β,17α-diol in substantially quantitative yield. The product was sufficiently pure for use as an intermediate or could be further purified by recrystallization.

The following specific example serves to illustrate but is not intended to limit the present invention.

Example 1

A slow stream of purified acetylene was passed for three hours through a solution of 25 cc. of methyl magnesium bromide (3 N in ether) in 100 cc. of anhydrous tetrahydrofurane and then a solution of 5 g. of DHA (Δ⁵-androsten-3β-ol-17-one) in 50 cc. of tetrahydrofurane was added. The mixture was heated on the steam bath for 15 minutes (a heavy precipitate forms), cooled and poured into a solution of 20 cc. of sulfuric acid in 1 lt. of water. The precipitate was collected, washed with water until neutral and dried on the steam bath, thus yielding 5.12 g. of ethinyl-androstenediol with a melting point of 228°–232° C. This yield corresponds to 94% of the theoretical and the product obtained is of sufficient purity to be used for any other commercial synthesis. Recrystallization from chloroform-hexane afforded 4.6 g. (85% of theory of 17-ethinyl-$\Delta^5$-androstene-3$\beta$,17$\beta$-diol with a melting point of 238°–240° C., analytically pure.)

*Analysis.*—Calcd. for $C_{21}H_{32}O_2$: C, 80.21; H, 9.62. Found: C, 79.93; H, 9.47%.

We claim:

1. A process for the production of androstene C–17 ethinyl derivatives which comprises reacting an androstene C–17 ketone with acetylene-di-magnesium bromide in tetrahydrofurane to form an intermediate product highly insoluble in the tetrahydrofurane and thereafter subjecting the product to cleavage in an acid medium.

2. A process for the production of 17$\alpha$-ethinyl-$\Delta^5$-androstene-3$\beta$,17 -diol which comprises reacting $\Delta^5$-androstene-3$\beta$-ol-17-one with acetylene-di-magnesium bromide in tetrahydrofurane to form an intermediate product highly insoluble in the tetrahydrofurane and thereafter subjecting the product to cleavage in an acid medium.

References Cited in the file of this patent

UNITED STATES PATENTS

| | | |
|---|---|---|
| 2,243,887 | Serini | June 3, 1941 |
| 2,806,030 | Ringold | Sept. 10, 1957 |
| 2,820,030 | Julian | Jan. 14, 1958 |